United States Patent [19]

Link

[11] 4,334,742
[45] Jun. 15, 1982

[54] MICROFICHE READER ASSEMBLY AND METHOD

[75] Inventor: William T. Link, Berkeley, Calif.

[73] Assignee: Datagraphix, Inc., San Diego, Calif.

[21] Appl. No.: 127,240

[22] Filed: Mar. 4, 1980

[51] Int. Cl.³ .............................................. G03B 21/22
[52] U.S. Cl. ..................................... 353/78; 353/121
[58] Field of Search .................................. 353/74–78, 353/98, 99, 73, 121, 122; 355/21, 66, 45; 352/104

[56] References Cited

U.S. PATENT DOCUMENTS

| | | | |
|---|---|---|---|
| 2,238,267 | 4/1941 | Katz | 353/44 |
| 3,225,648 | 12/1965 | Toler | 353/78 |
| 3,413,061 | 11/1968 | Simpson et al. | 353/27 R X |
| 3,914,037 | 10/1975 | Peters | 353/26 R |
| 4,110,021 | 8/1978 | Numbers | 353/27 R |
| 4,111,149 | 9/1978 | Wells | 353/78 |
| 4,184,755 | 1/1980 | Burgess | 353/45 |
| 4,270,850 | 6/1981 | Peters | 353/27 R |

FOREIGN PATENT DOCUMENTS 624898  9/1961  Italy ...................................... 353/78

Primary Examiner—Harry N. Haroian
Attorney, Agent, or Firm—Flehr, Hohbach, Test et al.

[57] ABSTRACT

A microfiche reader assembly for optically projecting a microfiche image on the backside of a screen for viewing from its front side is disclosed herein. This assembly includes a housing having an inner chamber, a projection screen supported by the housing and a support for the microfiche itself. A beam of light is passed through the microfiche along an incoming path and into the chamber where a plurality of light reflecting surfaces are utilized to redirect the same beam onto the backside of the screen along a plurality of different paths including a final path incident with the screen and at least one intermediate path between the incoming and incident paths. These paths are specifically selected to improve image contrast and corner image brightness at the screen and to provide a relatively long overall path length at a small field angle while minimizing the size of assembly housing necessary to contain the previously recited light reflecting surfaces.

10 Claims, 7 Drawing Figures

U.S. Patent   Jun. 15, 1982   Sheet 1 of 2   4,334,742
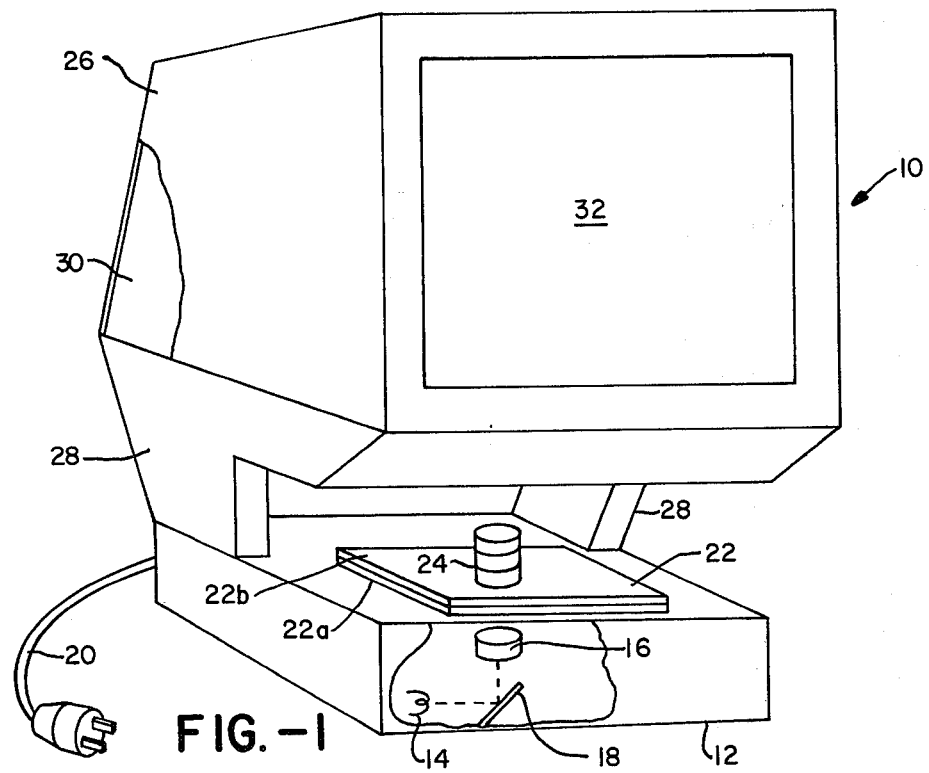
FIG.—1
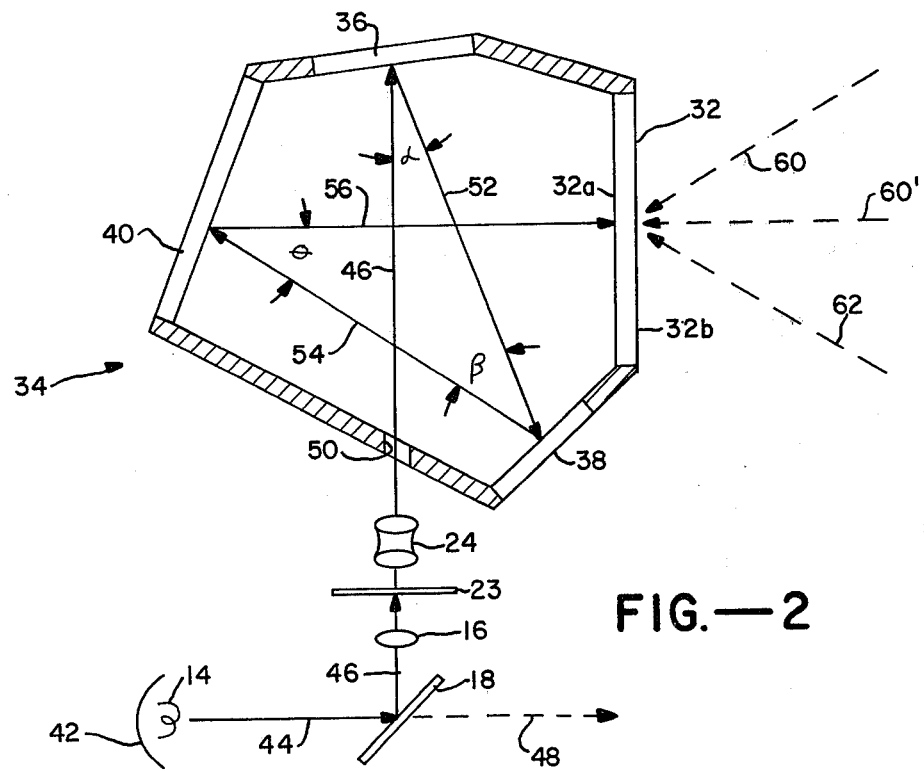
FIG.—2

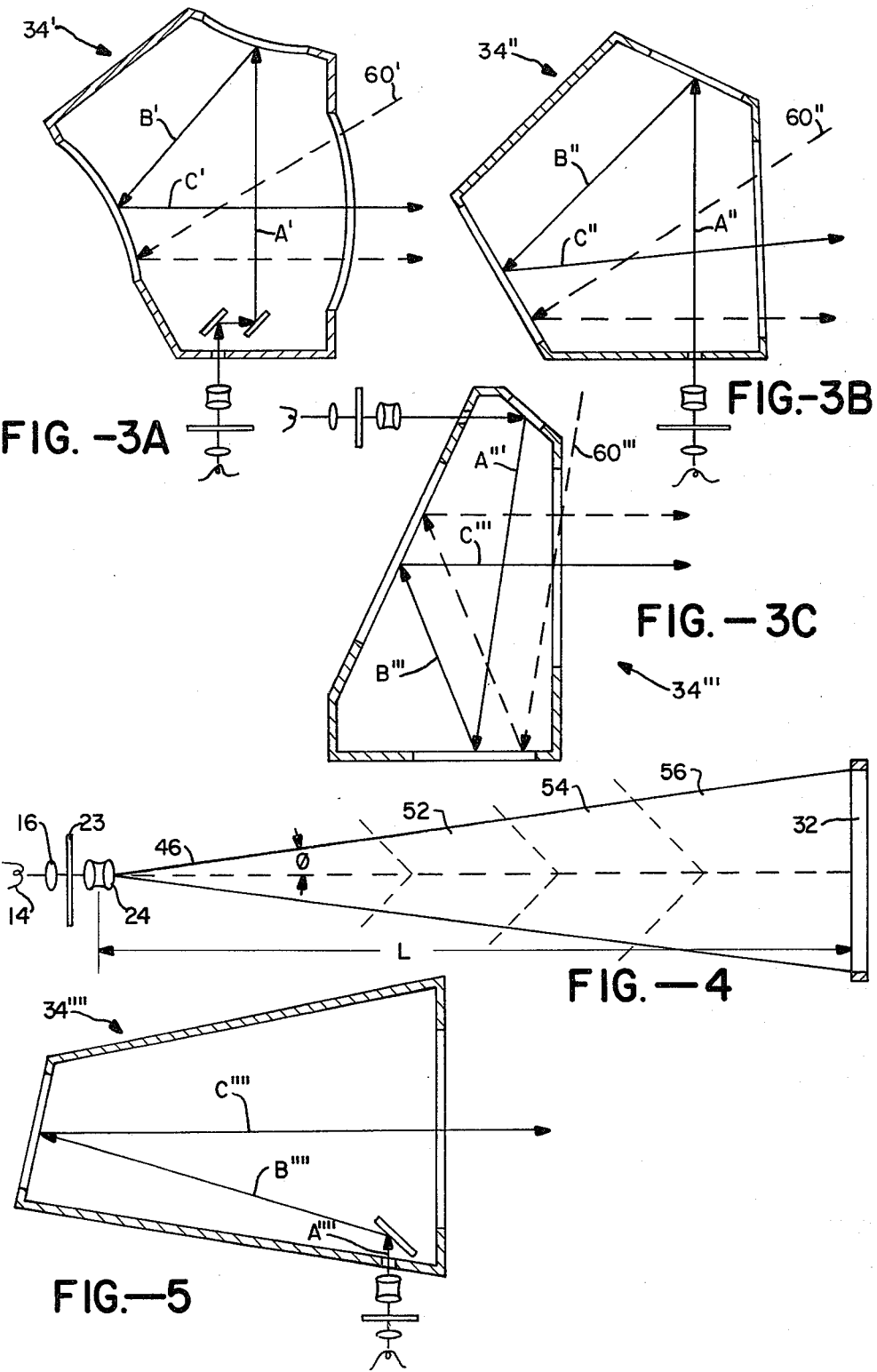

MICROFICHE READER ASSEMBLY AND METHOD

The present invention relates generally to a microfiche reader and its method of operation and more particularly to a microfiche reader assembly utilizing a unique optical arrangement which improves the assembly and its method of operation in a number of respects.

A typical microfiche reader assembly of the general type to which the present invention is directed is one which includes a housing having an inner chamber, a projection screen supported by the housing and a carriage or other such means for supporting the microfiche to be viewed. This assembly, which is of the rear projection type, also includes an optical arrangement for passing a beam of light through the microfiche and housing chamber and onto the backside of the screen for projecting an illuminated image of the microfiche thereon. As will be seen below, there are a number of ways that this can be done, both advantageously and with drawbacks.

First, the beam of light could be directed through the microfiche and projected onto the screen along a single straight line path or at most along two such paths. This unfolded or singlefolded geometry requires at most a single mirror or other such light reflecting surface and, hence, displays excellent contrast. More specifically, when ambient light passes into the housing chamber of a rear projection reader assembly through its screen, if any of this light is reflected back out through the screen, for example by internal mirrors or similar light reflecting surfaces, this reflected light (characterized as "glow") reduces the contrast of the projected image. In the case of an assembly with unfolded geometry, there is no reflecting surface which can contribute to glow and in the case of single fold geometry, the one light reflecting surface which is used, by virtue of its position, can only reflect the light back to the light source and not out through the screen. Accordingly, unfolded or single folded geometry minimizes glow and, as stated, provides excellent contrast.

The disadvantages with the microfiche reader assembly utilizing unfolded or single folded geometry reside in the size of housing which is necessary to confine the overall beam, as it relates to the field angle of the beam. Specifically, in order to provide a beam with a small field angle and yet one which completely covers the screen, the housing would have to be impractically large to contain the extremely long light beam necessary to accomplish this. On the other hand, to reduce the housing to a practical size using unfolded or single folded geometry, a large field angle is required for the same size screen, thereby eliminating many advantages (to be discussed) which result from utilizing a small field angle.

It is possible, however, to provide a microfiche reader assembly with a housing practical in size while at the same time utilizing a beam having a relatively small field angle. This can be accomplished by directing the beam of light through the housing along a greater number of straight line paths so as to extend the optical length of the paths significantly. However, this multi-folded geometry requires at least one mirror or similar light reflecting surface over and above the one required for single folded geometry and this additional surface or surfaces (depending upon the number of paths taken by the beam) could contribute to glow and hence could reduce contrast unless carefully positioned relative to the screen and to one another.

As will be seen hereinafter, the microfiche reader assembly disclosed herein combines multi-folded geometry with carefully positioned light reflecting surfaces to provide a relatively small field angle and small housing while, at the same time, minimizing glow to improve image contrast across the screen and also at the same time improving corner image brightness. Moreover, this is accomplished in an uncomplicated and reliable way.

One object of the present invention is to provide a microfiche reader assembly which not only displays satisfactory viewing contrast but is also constructed of a relatively small housing while, at the same time, utilizing a beam having a relatively small field angle.

A further object of the present invention is to provide a method of projecting an optical image of at least a section of a microfiche onto a screen utilizing the assembly just recited.

As will be seen hereinafter, the microfiche reader assembly disclosed herein is one which includes housing means, a screen having a backside and an opposite front side supported by the housing means and means for supporting a microfiche in a predetermined position. This assembly also includes means for passing a beam of light through at least a segment of the microfiche and into the housing means along a predetermined incoming path, and an optical arrangement for directing the passed through beam of light from the incoming path through the housing means to and through the screen from the backside of the screen to its front side.

In accordance with one aspect of the present invention, the optical arrangement just recited includes a plurality of light reflecting surfaces which redirect the incoming beam along a plurality of paths which differ from one another and from the incoming path and which include a final path incident with the screen and at least one intermediate path. In this way, a relatively long optical path between the source of light producing the beam and the projector screen can be provided within a relatively small space. In a preferred embodiment, the longest of all of these paths contributes no more than about 30% to 35% of the total path length. This, in turn, means that the assembly housing for the optics can be relatively small rather than larger and bulky while, at the same time, the field angle of the beam can be relatively small, on the order of approximately 10° in a preferred embodiment, without sacrificing screen size.

In accordance with another aspect of the present invention, the light reflecting surfaces just recited are positioned relative to the screen and to one another such that any high angle light passing into the housing means through the screen and onto these surfaces is not reflected by the surfaces back through the screen. In this regard, high angle light consists of any ambient light passing into the housing means through the screen along paths normal to and at downwardly directed angles with the screen. One way to insure that this particular ambient light entering the housing means is not reflected back through the screen is to position the light reflecting surfaces relative to one another and to the screen so that the previously described incoming and intermediate beam paths and the final beam path are not parallel or even substantially parallel with any high angle light passing into the housing means. This will minimize screen glow and help maximize the contrast.

In this regard, it is not necessary to eliminate back reflection of low angle light entering the housing means through the viewing screen. This is because low angle light, which consists of ambient light passing into the housing means through the screen along paths extending at upwardly directed angles with the screen, is usually small in comparison to high angle light since most of the ambient light originates directly behind and/or above the viewer (from windows or light fixtures). Hence, it is possible to position the light reflecting surfaces comprising part of the overall assembly such that one or more of the beam paths, typically the incoming and intermediate beam paths, are parallel or substantially parallel with low angle light entering the housing means without increasing screen glow and reducing contrast in any significant way.

The direct advantages of minimizing screen glow and improving visual contrast should be self-explanatory. For example, the microfiche image projected across the screen becomes more legible and easily read. In addition, less power may be required to provide satisfactory viewing. The importance of utilizing a long optical path and small field angle within an assembly housing of practical size (by virtue of the multi-folded geometry) may not be quite as obvious. For example, one advantage resides in the type of projection lens which can be used in the overall optical arrangement. More specifically, a projection lens which operates on a small field angle will, in most cases, be less expensive than a lens of comparable quality which operates on a larger field angle. On the other hand, at the same price, a higher quality projector lens may be provided for operating at lower field angles.

Another advantage which results from the use of a small field angle is the attendant reduction in vignetting along the outer edge of the projection lens. In fact, at a field angle of 10° which is the preferred operating field angle in the assembly disclosed herein, vignetting is entirely eliminated with many readily available projection lenses. In this regard, most projector lenses are designed to operate with a limited percentage of efficiency from a vignetting standpoint, for example 50% efficiency, at a field angle of 20°. However, these same lenses will operate with 100% efficiency (no vignetting) at a field angle of 10°. Accordingly, the projector lens utilized with the preferred assembly disclosed herein (the 10° field angle) can be easily provided to operate without vignetting or, as an alternative, a less expensive lens and yet one which is satisfactory may be designed to operate at 50% vignetting efficiency for the 10° field angle.

Still another advantage of utilizing a small field angle is one which also requires a relatively long optical path. More specifically, by providing a small field angle and a long path, the observed projector screen brightness is more uniform than would be the case if the field angle were larger. This is because the light rays from a beam which operates at a low field angle impinge on the screen more normally than at high field angles, that is, all of the light rays more closely approach 90° to the screen when the center of the beam is oriented normal to the screen.

FIG. 1 is a partially broken away perspective view of a microfiche reader assembly constructed in accordance with the present invention.

FIG. 2 is a diagrammatic illustration of the optical operation of the assembly illustrated in FIG. 1 and specifically showing how improved contrast is obtained by this assembly.

FIGS. 3A, 3B and 3C diagrammatically illustrate optical arrangements for microfiche reader assemblies having relatively poor contrast.

FIG. 4 diagrammatically depicts the optical arrangement of FIG. 2 in a single straight line path and particularly shows the overall length of the path and its relatively small field angle.

FIG. 5 diagrammatically illustrates the optical arrangement for a microfiche reader having satisfactory contrast and field angle but a very large housing.

Turning now to the drawing, wherein like components are designated by like reference numerals throughout the figures, a microfiche reader assembly constructed according to the present invention is illustrated in FIG. 1 and generally designated by the reference numeral 10. As illustrated in this figure, the overall assembly includes a base 12 which serves as a housing for many of the components making up the assembly including a light source 14 and condenser lens 16 as well as suitable means (not shown) for mounting these components in fixed positions to be described below. Other components in the base may include a mirror 18 for redirecting the visible radiation from light source 14 to condenser lens 16 while passing infrared radiation and suitable power receiving means associated with a cord 20. Base 12 also serves to support a fiche carriage 22 which as illustrated includes a pair of horizontally extending, confronting glass plates 22a and 22b hinge mounted together so that the top plate can be lifted for inserting a microfiche 23 (FIG. 2) therebetween. The entire carriage also includes means (not shown) for supporting the two glass plates for movement in a horizontal plane just under a projection lens 24. This projection lens which also comprises part of the overall assembly is mounted in the position illustrated, that is, just above the fiche carriage in vertical alignment with the condenser lens by suitable means (not shown).

Microfiche reader assembly 10 also includes a main housing 26 which is supported above and to base 12 by side brackets 28. This housing defines an inner chamber 30 and serves to support an approximately vertically extending, planar projector screen 32 having a backside 32a facing into the chamber and an opposite front side 32b for viewing from outside the housing. The housing also serves to contain an overall optical arrangement 34 to be described below with respect to FIG. 2.

Turning specifically to FIG. 2, optical arrangement 34 is shown (diagrammatically) including three mirrors 36, 38 and 40, each having its own planar light reflecting surface facing into the chamber 30. Each of these mirrors is mounted by suitable rear mounts (not shown) within the housing chamber in a predetermined position relative to the other mirrors and to screen 32. As illustrated in FIG. 2, light source 14 which includes its own parabolic reflector 42 produces a beam of light along horizontal path 44. Previously recited mirror 18 redirects the visible components of this light on a vertical path 46 while passing the infrared components generally indicated at 48 horizontally therethrough. The visible light on path 46 extends through condenser 16 and a particular segment of the microfiche located within carriage 22, depending upon the position of the fiche carriage. The light thereafter passes through projector lens 24 along path 46 and into the housing chamber 32 through a cooperating opening 50. This vertical beam of light on incoming path 46 impinges on the light reflecting surface of mirror 36 and is redirected along a second path 52 which slopes downward and forward, that is, in the direction towards screen 32. In an actual working embodiment, an angle alpha ($\alpha$) approximately 20° is subtended by incoming path 46 and path 52. The light along path 52 impinges upon the light reflecting surface of mirror 38 and is redirected along still another straight line path 54 which slopes upward and away from screen 32. In an actual working embodiment, an angle beta ($\beta$) is subtended by the two paths 52 and 54 and is approximately 31°. The light along path 54 impinges on the light reflecting surface of mirror 40 and is redirected along a final exit path 56 in the direction of screen 32, preferably in the horizontal direction normal to the screen. In an actual working embodiment, an angle theta ($\theta$) is subtended by this exit path and path 54 and is approximately 41°.

The way in which microfiche reader assembly 10 operates to provide an enlarged image of the microfiche (or segment) is well known and hence will not be discussed in detail herein. It should suffice to say that the beam of light generated by source 14 is passed through the condenser lens which focuses the beam through the microfiche and to a predetermined point relative to projection lens 24. This latter lens projects the illuminated section of the microfiche onto the screen 32 by optical arrangement 34, that is, mirrors 36, 38 and 40. As long as no light other than the beam from source 14 passes through the screen from its back side to its front side, the contrast across the screen will be satisfactory. However, any secondary light, that is, any light other than the beam from source 14, passing through the screen from its back side to its front side along the control light will adversely affect viewing contrast. One potential source of secondary light is the ambient light surrounding the overall assembly, that is, the external light which is capable of passing into chamber 30. In this regard, it is important to maintain housing 26 as light tight as possible.

Even if the housing structure is made light tight, there is always the possibility that ambient light will enter chamber 30 through screen 32 from its front side to its back side. For reasons to be discussed below, this light can be divided into two types, high angle light and low angle light. High angle light consists of any ambient light passing into the chamber through the screen along any paths normal to and or at downwardly directed angles with the screen as indicated generally by the two arrows 60. Low angle light consists of any ambient light passing into the chamber through the screen at an upwardly directed angle with the latter, as generally indicated by the arrow 62. Obviously, this light may contribute to the secondary light just described if reflected back through the screen along with the controlled beam generated by source 14. A number of possible sources of reflection are the light reflecting surfaces of mirrors 36, 38 and 40. However, as will be discussed below, these mirrors are positioned in accordance with the present invention so that any high angle light entering chamber 30 through the screen and onto the light reflecting surfaces is not reflected back through the screen.

In order to prevent the above described "back reflection" of high angle light, each of the light beam paths is positioned such that there is no high angle light parallel therewith. From FIG. 2, it should be evident that this is the case. For example, it is impossible for any high angle light entering chamber 30 to be parallel with paths 46, 54, or 56. While not quite as obvious, upon inspection it can be seen that this is equally true for path 52. Moreover, it should be noted that path 56 is anti-parallel to incoming high angle light 60 causing this latter light to be directed back to source 14. Hence, no high angle light entering the chamber through screen 32 can be reflected back out through the screen by means of the mirrors. This is to be contrasted with the optical arrangements illustrated in FIGS. 3A, 3B and 3C. Each of these arrangements (generally indicated at 34', 34'' and 34''') includes a plurality of mirrors for dividing the light beam into at least three paths A, B and C which are appropriately primed as indicated in the figures. Note, however, that in all cases one of the A or B paths is roughly parallel with incoming high angle light. In the case of optical arrangement 34', path B' is roughly parallel with incoming high angle ray 60'. In arrangement 34'', path B'' is parallel with high angle ray 60'' and, finally, in the case of arrangement 34''', path A''' is parallel with high angle ray 60'''. Following each high angle ray as it enters the chamber of its associated arrangement, it can be seen that the ray eventually exits the associated screen after at least one reflection (as in arrangements 34' and 34'') or after a number of reflections (as in arrangement 34''').

From the foregoing, it should be apparent that none of the optical arrangements described including arrangement 34 prevents back reflection of low angle light. However, under normal circumstances, most of the ambient light which is a potential contributer of back reflection is light emanating from luminaires at the ceiling and/or light from windows. There is at most a small contribution from low angle light and hence the possibility of back reflection from this light can be ignored.

The high contrast resulting from minimizing back reflection is only one aspect of the present invention. A second aspect resides in the multi-folded feature of arrangement 34 which allows the overall optical length of its light beam to be long and its field angle to be small without requiring a relatively large, bulky housing. More specifically, arrangement 34 is specifically designed so that its mirrored surfaces divide the beam passing into its chamber 30 into at least three and most preferably four straight-line segments between the microfiche and screen. As illustrated in FIG. 2, these segments are defined by the incoming path 46, paths 52 and 54 (intermediate paths) and path 50 (the exit path). In order to minimize the longest direction of housing 26, the longest one of these segments, that is, the longest path, should contribute no more than between 25 and 40 percent of the total length of the segments and preferably no more than 30 percent. From FIG. 2, it should be obvious that the longest path illustrated is the incoming path 46. In an actual working embodiment, this path from the projection lens to mirror 36 is 11.5 inches long whereas the total length of all the paths from the projection lens to the screen is about 40 inches long.

The overall length of the light beam illustrated in FIG. 2 is shown in a single straight line in FIG. 4. Note that this beam extends from the light source to the outer periphery of screen 32 with a relatively low field angle Phi ($\phi$). In a preferred embodiment, the size of screen 32 and the length of the beam path (indicated at L) are such that field angle phi is between 7° and 13° and preferably 10°. In an actual working embodiment, screen 32 is 8.4 inches high by 10.7 inches wide, the overall length L of the beam is 40 inches and the field angle at the screen corners is 9.7°. This is true even though the maximum dimension of housing 26 is only 12 inches. This should be contrasted with the optical arrangement 34'''' in FIG. 5 which includes an arrangement of mirrors for dividing its light beam into three segments A'''', B'''', and C''''. Note that the folding characteristics of this arrangement are quite poor. More specifically, the largest path segment, specifically segment C'''', is at least 50% of the total beam path. Hence, in order to get a long beam path and a small field angle, it would be necessary to provide an extremely long housing. On the other hand, if the housing is to be small, the overall beam and associated field angle would have to be relatively large. Hence, while arrangement 34'''' provides satisfactory viewing contrast as compared to the arrangements illustrated in FIGS. 3A, 3B and 3C, it does not include the advantages attendant with proper multi-folding characteristics, that is, the advantages of a relatively small housing with a beam having the relatively long overall length and small field angle.

What is claimed is:

1. A microfiche reader assembly, comprising:
   (a) a housing including an inner chamber;
   (b) a generally vertically extending projector screen supported by said housing and having a back side facing into said chamber and an opposite front side for viewing from outside said housing;
   (c) means for supporting a microfiche in a predetermined position below said chamber;
   (d) means for passing a beam of light through at least a segment of said microfiche and generally vertically upwards into said housing chamber at a field angle between about 7° and 13°; and
   (e) an optical arrangement for directing said passed through beam of light through said chamber and to and through said screen from its backside to its front side for viewing said microfiche segment on said screen, said arrangement including a plurality of light reflecting surfaces located within said housing chamber on different sides of the latter for dividing said passed through beam into at least three straight-line segments between said microfiche and said screen, the longest of said segments contributing no more than about 25 to 40% of the total length of all said segments and each of said segments extending entirely across said chamber and across at least one other segment, said light reflecting surfaces being positioned relative to said screen and one another such that any high angle light passing into said housing chamber through said screen and onto any of said surfaces is not reflected by said surfaces from said chamber back through said screen, said high angle light consisting of any ambient light passing into said chamber through said screen along paths normal to and at downwardly directed angles with said screen.

2. An assembly according to claim 1 wherein said light reflecting surfaces are positioned such that none of said divided beam segments is parallel to any of said high angle light.

3. An assembly according to claim 1 wherein said beam is divided into four segments.

4. An assembly according to claim 1 wherein said beam passing means is such that said beam of light has a field angle of about 10°.

5. An assembly according to claim 1 wherein said longest segment contributes no more than about 30% of the total length of all of said segments.

6. A microfiche reader assembly, comprising:
   (a) a housing including an inner chamber and an opening into the bottom of the latter;
   (b) a generally vertical projector screen supported by said housing and having a back side facing into said chamber and an opposite front side for viewing from outside said housing;
   (c) means for supporting a microfiche in a predetermined position under said housing opening;
   (d) means located below said microfiche supporting means for producing a beam of light having a predetermined field angle between about 7° and 13° and for directing said beam along an incoming path in a substantially vertically upward direction through a segment of said microfiche and into and entirely across said chamber through said housing opening; and
   (e) an optical arrangement for directing said beam through said chamber to and through said screen along four different straight-line paths none of which is greater than 25% to 40% of the total path length of said beam, said arrangement including,
     (i) a first light reflecting surface located at the top end of said chamber above and rearwardly of said screen for receiving and redirecting said beam from said incoming path along a second path which slopes downward entirely across said chamber towards a point just below and rearwardly of said screen,
     (ii) a second light reflecting surface located just below and rearwardly of said screen near the bottom end of said chamber for redirecting said beam from said second path along a third path which slopes upward and away from said screen entirely across said chamber, and
     (iii) a third light reflecting surface located rearwardly of and between said first and second surfaces at a back end of said chamber for redirecting said beam from said third path along an exit path entirely across said chamber in the direction of said screen.

7. An assembly according to claim 6 wherein said predetermined field angle is about 10°.

8. An assembly according to claim 6 wherein the longest of all of said paths contributes no more than about 30% of the total length of all of said paths.

9. A microfiche reader assembly, comprising:
   (a) housing means;
   (b) a generally vertical screen supported by said housing means and having a back side and an opposite front side;
   (c) means for supporting a microfiche in a predetermined position below said housing means;
   (d) means for passing a beam of light having a field angle of about 10° through at least a segment of said microfiche and into said housing means along a predetermined generally vertical incoming path; and
   (e) an optical arrangement for directing said passed through beam of light from said incoming path through said housing means to and through said screen from its back side to its front side along three additional paths which differ from one another and from said incoming path and which include a final path incident with said screen, all four of said paths being selected such that the longest one contributes no more than about 30% of the total length of all of said paths from said microfiche to said screen and each of said paths being positioned relative to said screen so as not to extend in a direction which is parallel or substantially parallel with high angle light passing into said housing means through said screen, said high angle light consisting of any ambient light passing into said housing means through said screen along paths normal to and at downwardly directed angles with said screen.

10. A method of projecting an optical image of at least a section of a microfiche onto a generally vertical screen having a backside and an opposite frontside, comprising:

(a) supporting a microfiche in a predetermined position below and rearwardly of said screen;

(b) passing a beam of light having a field angle of about 10° through at least a segment of said microfiche and into a housing means above said microfiche along a predetermined generally vertical incoming path; and (c) directing said passed through beam of light from said incoming path, through said housing means to and through said screen from its backside of its frontside along three additional paths which differ from one another and from said incoming path and which include a final path incident with said screen, all four of said paths being selected such that the longest one contributes no more than about 30% of the total length of all of said paths from said microfiche to said screen and each of said paths be positioned relative to said screen so as not to extend in a direction which is substantially parallel with high angle light passing into said housing means through said screen, said high angle light consisting of any ambient light passing into said housing means through said screen along paths normal to and at downwardly directed angles with said screen.

* * * * *